United States Patent [19]

Hafner et al.

[11] Patent Number: 4,682,533
[45] Date of Patent: Jul. 28, 1987

[54] VANDAL RESISTANT AND TAMPER PROOF PNEUMATIC PUSH BUTTON ASSEMBLY FOR MOVING A VOLUME OF FLUID

[75] Inventors: V. Walter Hafner, Whittier; Ron T. Hahn, Fullerton; Keith D. Marshall, Whittier, all of Calif.

[73] Assignee: Acorn Engineering Company, City of Industry, Calif.

[21] Appl. No.: 823,393

[22] Filed: Jan. 28, 1986

[51] Int. Cl.$^4$ .................. F01B 19/00; F16J 3/00
[52] U.S. Cl. ................... 92/98 R; 92/169; 4/407; 4/408
[58] Field of Search .......... 92/98 R, 101, 169.1, 92/96, 102; 403/194, 197, 200, 239; 251/57, 295; 137/359; 4/405, 407, 408, 302, DIG. 3, DIG. 15

[56] References Cited

U.S. PATENT DOCUMENTS

| | | | |
|---|---|---|---|
| 1,819,947 | 8/1931 | DeLauaud | 92/101 |
| 1,973,170 | 9/1934 | Jacobi | 403/194 X |
| 2,192,548 | 3/1940 | Gunderson | 92/94 |
| 2,267,218 | 12/1941 | Reinecke | 92/96 |
| 2,781,784 | 2/1957 | Baker | 92/98 D |
| 2,908,290 | 10/1959 | Hamilton-Peters et al. | 251/57 X |
| 3,107,127 | 10/1963 | Cheureux et al. | 251/57 X |
| 3,117,588 | 1/1964 | Billeter | 137/359 |
| 3,218,978 | 11/1965 | Kalert, Jr. | 92/98 R |
| 4,021,157 | 5/1977 | Elderfield | 92/98 R X |
| 4,304,015 | 12/1981 | Hubatka | 4/408 X |

FOREIGN PATENT DOCUMENTS 525515 5/1956 Canada .................. 92/96

Primary Examiner—Robert E. Garrett
Assistant Examiner—Mark A. Williamson
Attorney, Agent, or Firm—Edgar W. Averill, Jr.

[57] ABSTRACT

A push button assembly for moving a volume of fluid out of and into a port. The assembly has a housing containing a rubber-domed diaphragm. The domed diaphragm is designed so that it is deformable but readily returns to its original shape. The pressing of the push button depresses the diaphragm, thereby forcing air or other fluid out of the exit port. When the button is released, the diaphragm returns to its original shape pulling fluid back through the port.

29 Claims, 10 Drawing Figures

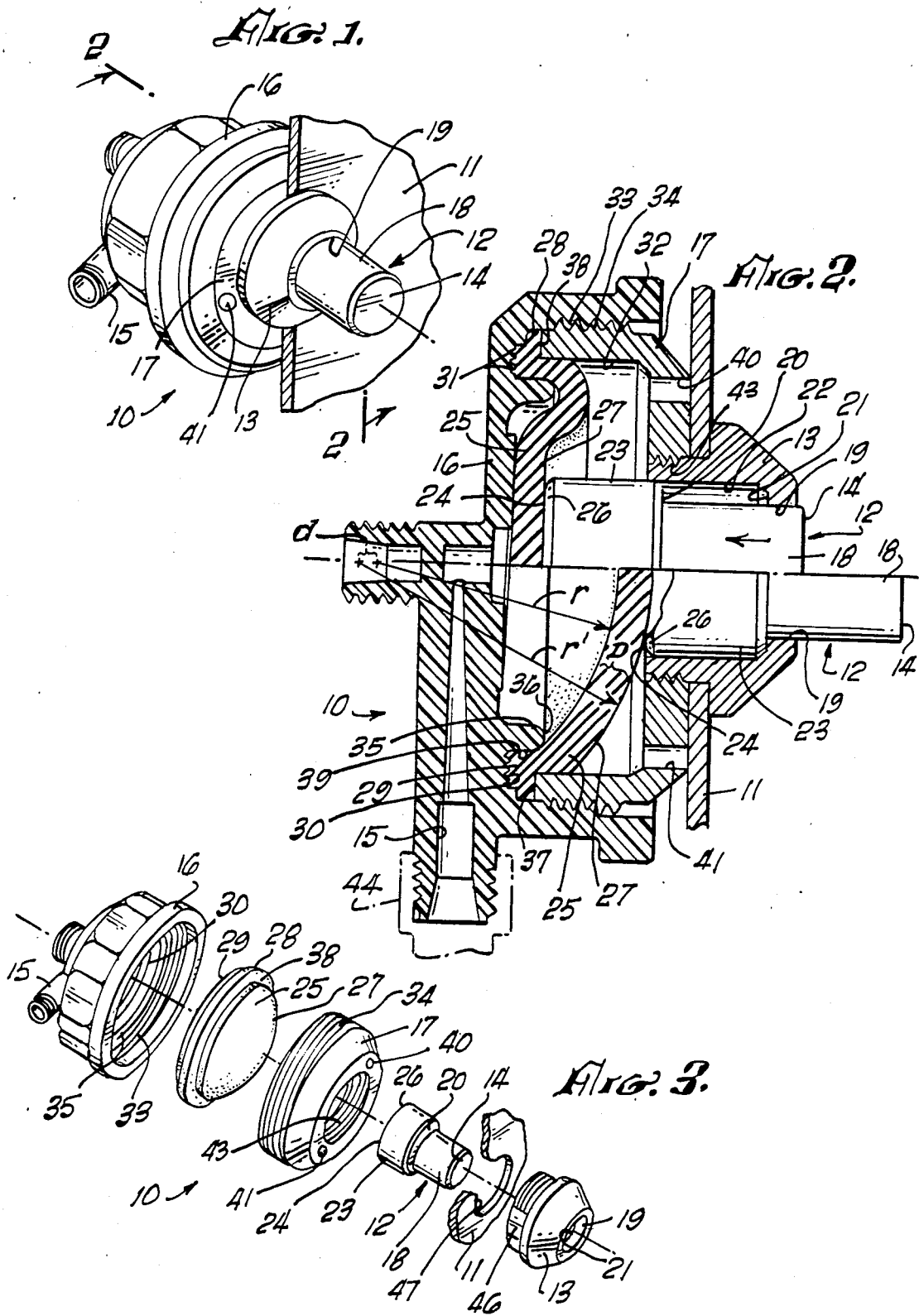

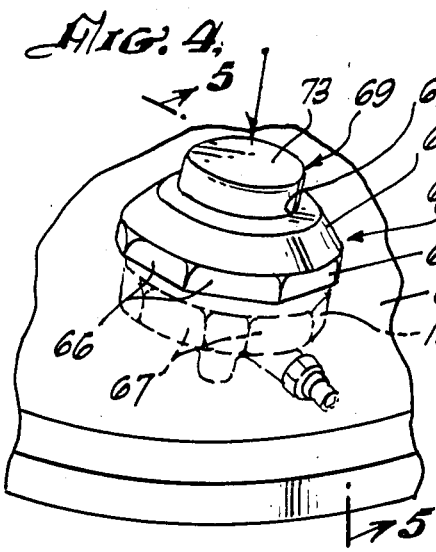
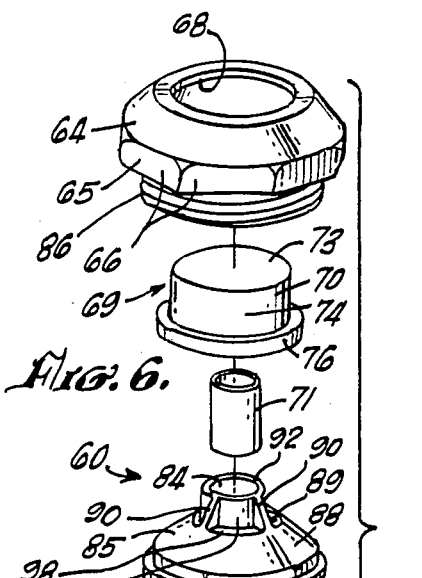
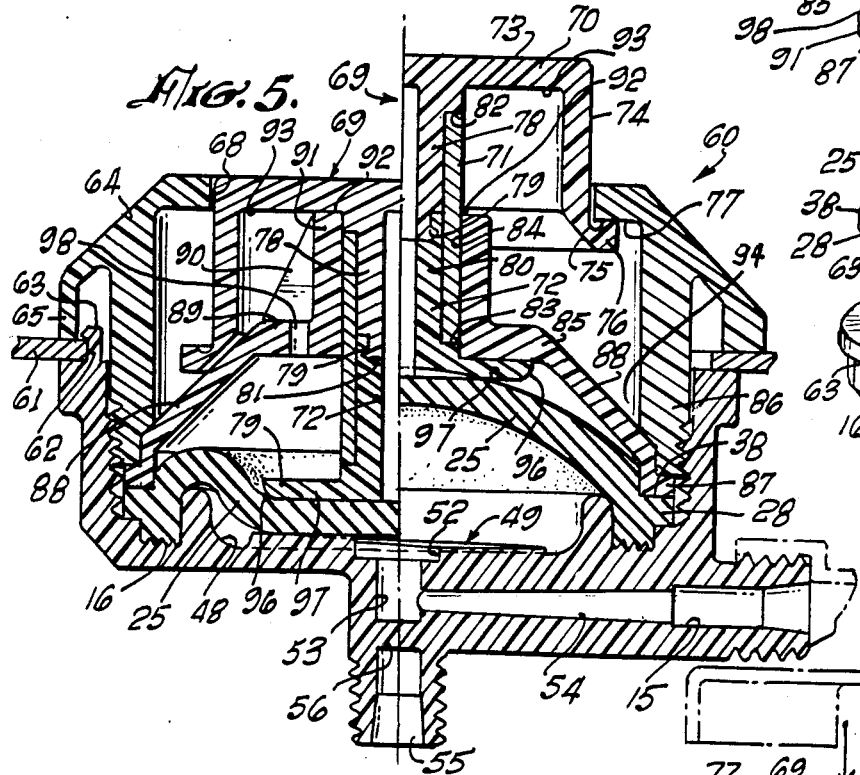
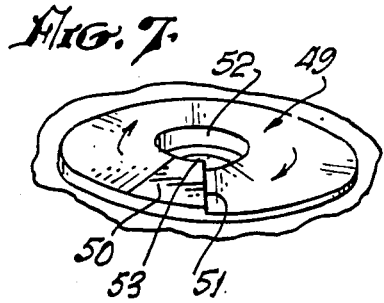
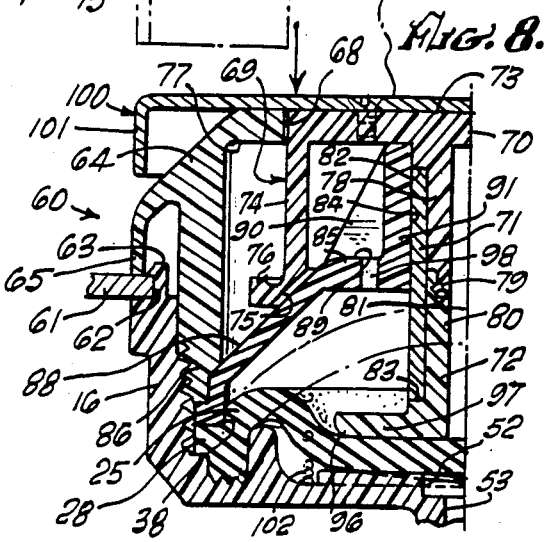

VANDAL RESISTANT AND TAMPER PROOF PNEUMATIC PUSH BUTTON ASSEMBLY FOR MOVING A VOLUME OF FLUID

BACKGROUND OF THE INVENTION

The field of the invention is pneumatic control apparatus, and the invention relates more particularly to push buttons which may be operated by hand, and or foot, and which cause air or other fluids to move into and out of the port of the push button assembly.

Common approaches for operating air-controlled valves include the use of bellows or a piston and cylinder arrangement, but such approaches frequently require maintenance if not carefully operated. For applications which must withstand abuse such as when used to control water valves in public restrooms, such piston or bellows approaches do not have sufficient durability and reliability for practical use.

SUMMARY OF THE INVENTION

It is, thus, an object of the present invention to provide a push button assembly which may be operated either by hand or foot and which assembly is highly reliable and resistant to damage by the user.

The present invention is for a push button assembly which may be mounted in a wall for moving a volume of air or other fluid out of and into a port. The assembly has a housing having at least one port for the passage of fluid, and the housing, preferably, has a circular ridge formed on the floor thereof. The port has an inner terminus which is located in the floor area, and a sealing surface is positioned about the exterior of the floor area for contact with a rubber, circular, domed diaphragm. The diaphragm is mounted so that its outer periphery contacts the sealing surface in the housing, and the domed portion of the diaphragm is positioned above the floor area. The diaphragm has sufficient thickness so that although it is deformable, it readily returns to its original shape. A diaphragm sealing element is affixed to the housing which may be tightened to cause the diaphragm to be forced against the sealing surface of the housing. An escutcheon member is affixed to the housing and has an opening for the passage of a push button member. A push button having a piston portion is held in the assembly, and the terminal portion of the push button contacts the domed diaphragm, and the button portion of the push button extends through the passageway of the escutcheon member. In a preferred embodiment, the assembly is mounted in a wall which has a hole therein, and the escutcheon member abuts the outer surface of the wall. When the push button is made for use as a foot operated push button, a stop cone is supported between the diaphragm sealing element and the diaphragm, and the stop cone extends upwardly and terminates with an upper stop ring which contacts the undersurface of the button portion of the push button when the push button is fully depressed. In a further preferred embodiment, a metallic sleeve is positioned between the push button member and the stop cone.

BRIEF DESCRIPTION OF THE DRAWINGS

FIG. 1 is a perspective view of the hand-operated push button of the present invention mounted in a wall which has been cut away.

FIG. 2 is an enlarged cross-sectional view taken along line 2—2 of FIG. 1.

FIG. 3 is an exploded perspective view of the push button assembly of FIG. 2.

FIG. 4 is a perspective view of the foot-operated push button of the present invention.

FIG. 5 is an enlarged cross-sectional view taken along line 5—5 of FIG. 4.

FIG. 6 is an exploded perspective view of the foot-operated push button assembly of FIG. 5.

FIG. 7 is a perspective view of the floor portion of the housing of the push button assembly of FIG. 5.

FIG. 8 is a side view of a modified version of the foot-operated push button of FIG. 5.

DESCRIPTION OF THE PREFERRED EMBODIMENTS

Figure 9:
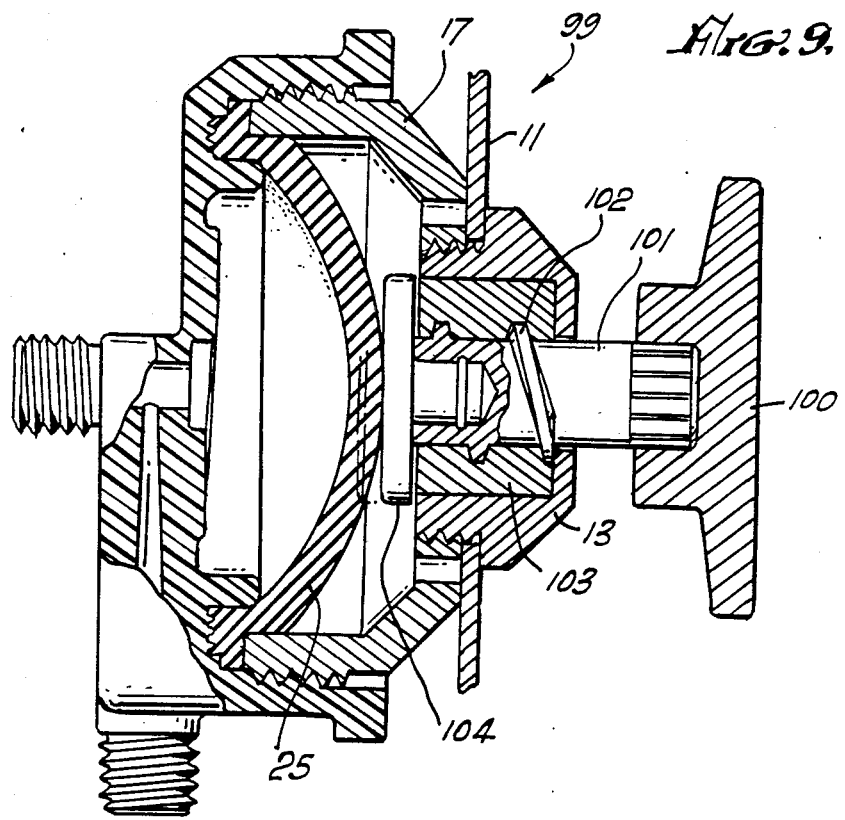
FIG. 9 is a cross-sectional side view of an alternate embodiment of the hand operated valve of FIG. 1.

A finger or hand-operated push button assembly is shown in perspective view in FIG. 1 and indicated by reference character 10. Assembly 10 is mounted in a wall 11 such as a stainless steel wall which is part of a hand-washing fixture. A push button member 12 extends through an opening in escutcheon 13. The assembly is operated by pushing the outer end 14 of push button member 12 in a manner described more fully below. The air or other fluid inlet or outlet port 15 is shown in FIG. 1 and is formed as an integral part of housing 16. The outer surface of a diaphragm sealing element 17 is also shown in FIG. 1 and its function is made clear in FIG. 2.

The interior construction of the push button assembly 10 is shown in FIG. 2 where it can be seen that push button member 12 has a cylindrical portion 18 which closely fits an opening 19 in escutcheon 13. Member 12 also has a shoulder 20 which abuts the upper surface 21 of chamber 22 when push button member 12 is in its fully extended position as shown in the lower half of FIG. 2. A piston portion 23 is an integral part of push button member 12 and fits closely within chamber 22 to hold the push button in its proper axial alignment. The inner or bottom surface 24 of push button member 12 contacts the rubber diaphragm 25 and, preferably, has a rounded edge 26 to reduce any tendency of the push button to damage the outer surface 27 of diaphragm 25.

Diaphragm 25 is fabricated from a flexible, elastic elastomer which is made of sufficient thickness so that it readily returns push button member 12 to its extended position without the need for an internal spring. An internal spring may be provided, however, in those instances where additional outward force is necessary. Normally, however, no internal spring is required.

Advantageously, diaphragm 25 is slightly thinner at its outer or domed portion and the center of curvature of the inner surface is shown at the base of radius "r" and that of the outer surface is at the base of radius "r'." The distance between the center of "r" and "r'" is indicated by the letter "d." The thickness "D" of the diaphragm increases away from the central axis of the diaphragm. This increases the flexibility of the diaphragm at the center domed portion and increases the bending force at the outer edge thereof.

Diaphragm 25 is generally circular in shape as shown best in FIG. 3 and has a circular contact ring 28. Diaphragm 25 also has a circular sealing ridge 29 which extends downwardly and which fits into a circular sealing groove 30 formed in housing 16. Sealing groove 30 may have a plurality of small annular ridges 31 at the base thereof to further prevent movement at the base of the diaphragm. It can be seen in FIG. 2 that diaphragm sealing element 17 has a hollow, cylindrical portion 32 which has threads 33 on its outer surface which screw into threads 34 on the inner surface of the outer cylindrical portion of housing 16.

An important feature of the present invention, in addition to the aforementioned diaphragm thickness variation, is the manner in which the diaphragm is sealed in the housing and adapted so that it may be flexed essentially indefinitely without any area of high stress being imparted to the diaphragm. The use of a circular ridge 35 having a rounded top 36 provides an important feature of the present invention and permits the diaphragm to be tightly held and yet not strained at any point. Note that the lower surface 37 pushes downwardly on the upper surface 38 of contact ring 28 which tends to urge the circular sealing ridge 29 against the annular ridges 31 in sealing groove 30 and also to force it against the outer surface 39 of ridge 35. This provides a large contact surface which prevents the escape of air or other fluids from the base of the diaphragm while still holding it in a manner which does not create a point of stress.

The diaphragm sealing element 17 has a pair of holes 40 and 41 which are used to tighten the sealing element into the escutcheon and against wall 11 by the insertion of a tool having a mating pair of pins. Once the sealing element has been tightened against the wall, the housing 16 and diaphragm 25 are screwed in place. The unit is then tightened by hand and is ready for attachment of an air line as shown in FIG. 2 in phantom line and indicated by reference character 44.

Housing 16 is, preferably, provided with hexagonal flats so that the diaphragm sealing element 17 may be tightly threaded therein.

The assembly may be made essentially vandal proof by providing a flat 46 on the threaded extension of the escutcheon and a mating flat 47 in the opening 42 in wall 11. Because the push button member 12 is cylindrical, it may be readily turned, but the escutcheon 13 is keyed into the wall so that it may not be turned. Thus, from the outside, one can merely push the button or turn it, but no other action can be taken and neither of these actions leads to disassembly or has any damaging effect on the assembly.

The push button assembly of the present invention may be readily adapted to use as a foot button as indicated in FIGS. 4 through 8. In FIG. 4, foot button assembly 60 is secured to the wall 61 of the base of a wash fountain or other device. Housing 16 is identical to housing 16 of FIGS. 1 through 3 and, thus, the same reference characters are used for the housing portion of both the hand and foot buttons. Further details of construction and function of housing 16 are described below which are also applicable to the hand button of FIGS. 1 through 3. For instance, several depressions have been added to the floor of the housing to prevent diaphragm 25 from becoming held to the floor of the housing. An annular groove 48 extends around the entire floor area of the base of ridge 35. This groove makes it virtually impossible for diaphragm 25 to form a partial vacuum and be sealed against the inner surface of ridge 35. To further prevent a sealing of diaphragm 25 against the floor of the housing, a generally inclined spiral surface 49 comprises the floor of the housing. A small flat area 50 is at one end of the spiral, and a step 51 is at the other end. A large recess 52 is located in the center of the generally inclined spiral surface 49, and a smaller recess 53 leads to a passageway 54 which conducts air or other fluids out through the inlet or outlet port 15. It is possible to connect an inlet/outlet line to port 55, in which case port 15 is capped and the solid section 56 is drilled out to permit the free flow of fluid. While a stepped, spiraled surface is shown, a groove formed in a flat surface would also tend to prevent a holding of the diaphragm against the floor.

Although the housing 16 and the diaphragm 25 are the same for both the hand and foot operated buttons, the push button portion and escutcheon portions are substantially different. Wall 61 has an opening 62, and four fingers 63 (shown best in FIG. 6) which snap into opening 62 holding the housing in the opening. In this way, the valve can be serviced from the outer surface of wall 61 which is very advantageous in many installations.

An escutcheon member 64 has an outer skirt 65 which contains a plurality of flats 66 which provide an octagonal shape for attachment of a wrench. Similarly, a plurality of flats 67 are formed in the exterior of housing 16 to facilitate holding the housing.

Escutcheon member 64 has a circular opening 68 through which the button portion of push button assembly 69 passes. Push button assembly 69 comprises three pieces, namely, a foot button 70, a stainless steel guide and bearing sleeve 71 and a piston 72. Foot button 70 has a top surface 73, a cylindrical portion 74, a conical recess 75 and a stop rim 76. Stop rim 76 prevents anyone from pulling foot button 70 out of escutcheon member 64 since it abuts against the undersurface 77 of escutcheon member 64. Push button 70 also has an inner cylinder 78 which has a rim 79. The purpose of inner cylinder 78 is to snap into and hold piston 72 which, similarly, has an inner cylinder 80 and a groove 81 which holds rim 79. Both inner cylinder 78 and inner cylinder 80 have recesses 82 and 83, respectively, which serve to hold stainless steel guide and bearing sleeve 71 in place. Sleeve 71 is used to reduce friction between the push button assembly and the inner surface 84 and stop cone 85.

Stop cone 85 is held between the inner skirt 86 of escutcheon member 64 and the upper surface 38 of contact ring 28 of diaphragm 25. The flange 87 of stop cone 85 extends outwardly and is, thus, securely held in place. Stop cone 85 has a conical portion 88, a flat portion 89 and four reinforcing gussets 90. Stop cone 85 also has a cylindrical button support sleeve 91 which has an inner surface 84 mentioned above. Stop cone 85 also has two holes 98 which facilitate the passage of air from above diaphragm 25 to the atmosphere. Support sleeve 91 has an upper surface 92 which contacts the bottom surface 93 of foot button 70. This stops the downward movement of piston 72 and increases the life of the diaphragm by preventing excessive compression of the center portion of the diaphragm. It also reduces the strain on the outer rim of piston 72. As with the rounded edge 26 of piston 23 of the hand operated push button, it is preferable that edge 96 of piston 72 also be rounded.

Stop cone 85 also functions to collect any dust or dirt which can slip through opening 68 and holds the same in a recess indicated generally by reference character 94.

Although sleeve 71 has been referred to as a stainless steel guide and bearing sleeve, other materials may be used as long as they have a low coefficient of friction with the inner surface 84 of the button support sleeve 91. Although metal sleeves have been found particularly effective, it is likely that teflon and other polymers having high slip characteristics would be useful. Since it is common for the user of such foot buttons to depress the button by pressure at a corner such as indicated in FIG. 4 by reference character 95, it is important that there be a low coefficient of friction between the outer surface of sleeve 71 and the inner surface 84. Sleeve 71 also functions to provide further support of the connection between foot button 70 and piston 72.

The foot button construction is shown in exploded perspective view in FIG. 6 where the reinforcing gussets are clearly shown as is guide and bearing sleeve 71. It is also beneficial that piston 72 has an extended contact disk 97 which spreads out the pressure of the piston against diaphragm 25. This also helps to completely expel almost all of the air or other fluid from the undersurface of diaphragm 25 when the button is depressed.

Figure 10:
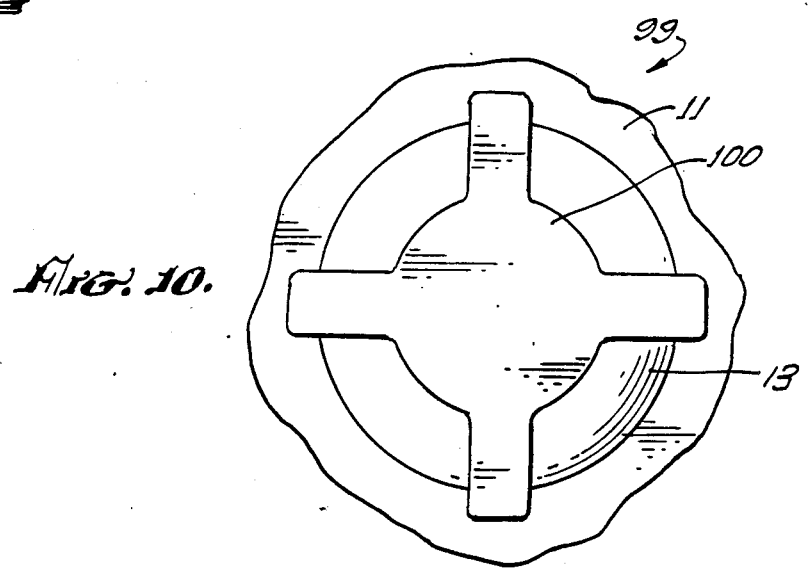
FIG. 10 is a top view of the valve of FIG. 9.

A modified version of the push button is shown in FIG. 8 where a dust and dirt shedding cover 100 is affixed to foot button 70. Skirt 101 of cover 100 extends outwardly and downwardly to prevent dirt from entering through opening 68. Another modification is the addition of spring 102 which could be used if additional upward force is needed. While the term, "push button," has been used throughout the specification, this term is intended to encompass functionally equivalent structures. The valve top structure 99 of FIGS. 9 and 10 has a handle 100 affixed to a shaft 101 which, in turn, is held by a threaded insert 103 in escutcheon 13. Shaft 101, preferably, has acme threads 102 to facilitate the steep thread angle. Piston 104, preferably, turns in shaft 101 to reduce wear on diaphragm 25. Valve 99 is shown in top view in FIG. 10. Additionally, toggle switches, ball point pen type retractor buttons, and the like, can readily be made to serve the equivalent function of a hand or foot button. Furthermore, the diaphragm could be exposed and depressed by direct contact with hand or foot.

In operation, it has been shown that both the hand and foot button are capable of both providing an outward flow of air or other fluid out of its exit port such as port 15 and also is capable of providing an inward flow through this same port to the interior area below diaphragm 25. This inward movement is useful in the operation of many valves and, thus, both inward and outward fluid flow is provided by the valves of the present invention. The diaphragm should, of course, be made from a material of high elasticity so that it has a strong tendency to return to its original domed configuration. Polymers such as EPDM have been found satisfactory for this purpose. Another advantage of the design of the finger or hand operated push button assembly of the present invention is the non-hold-open feature of the assembly. If the push button member 12 is held open, as for instance with a pin, the water will not run. The water flow is started only when the button is released, and then only for a timed cycle. This is an important feature in vandal prone applications.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:
1. A push button assembly mounted in a wall for moving a volume of fluid out of and into a port, said assembly comprising:
    a housing having at least one port for the passage of fluid, said housing having a circular ridge formed on the floor thereof, said circular ridge surrounding a floor area and having a sealing surface located on the exterior of the circular ridge and a sealing groove formed about the periphery of the circular ridge, and said port having an inner terminus which is located in said floor area;
    a diaphragm sealing element affixed to said housing, said diaphragm sealing element having a circular, pressure-applying surface located about the periphery of said circular ridge;
    a rubber, circular, domed diaphragm mounted in said housing, and the base of said diaphragm lying along the outer periphery of said circular ridge, and said diaphragm having an outwardly extending contact ring and a downwardly extending sealing ridge, the outer periphery of the contact ring being surrounded by the housing and the circular pressure-applying surface of the diaphragm sealing element and the domed portion of said diaphragm positioned above the floor area, said diaphragm having sufficient thickness so that although it is deformable, it readily returns to its original shape and wherein said housing has two additional circular sealing surfaces in addition to the sealing surface on the circular ridge, said additional sealing surfaces being positioned around the periphery of the circular ridge, the first sealing surface being directly adjacent the outer edge of said ridge and facing upwardly and the second sealing surface being formed about the exterior of the first sealing surface and at a higher level, also facing upwardly, and wherein the outwardly extending contact ring of said diaphragm is positioned on the upper surface of the second sealing surface, and the downwardly extending sealing ridge of the diaphragm fitting within the sealing groove of the housing so that an airtight seal is formed at the contact ring;
    a wall for mounting the push button assembly, said wall having an inner surface and an outer surface, said wall having a hole formed therein;
    an escutcheon member affixed to said housing, said escutcheon member having a widened escutcheon portion which abuts the outer surface of the wall, said escutcheon member having a chamber for housing a push button member and having a passageway extending through the escutcheon portion; and
    push button means having a piston portion held in the chamber of said escutcheon member, the terminal portion thereof contacting the domed diaphragm and a button portion which extends through the passageway of the escutcheon member to permit the operation thereof from the outer surface of the wall, whereby when the button portion is pushed, the terminal portion of said push button means depresses said domed diaphragm forcing the fluid within said dome through the port, and when said button is released, said domed diaphragm returns to its original shape thereby pulling fluid back in through said port.
2. The push button assembly of claim 1 wherein said button is adapted for operation by hand, and wherein said push button member has two cylindrical portions and turns freely in said escutcheon member, and wherein said escutcheon member is keyed in a non-turning relationship with respect to the wall so that the assembly is a vandal-resistant assembly.

3. The push button assembly of claim 2 wherein the upper surface of said sealing element contacts the back surface of the wall.

4. The push button assembly of claim 1 wherein the sealing element is threaded into said housing.

5. The push button assembly of claim 1 wherein the port of said housing has its inner terminus in the center of the generally flat floor, and the port extends at a generally right angle with respect to the central axis of the push button means.

6. The push button assembly of claim 1 wherein said housing has a hexagonal outer surface to facilitate holding thereof.

7. The push button assembly of claim 1 wherein the surface of said first sealing surface has a plurality of grooves formed therein.

8. The push button assembly of claim 1 wherein said button is adapted for operation by foot and further including a stop element held within the chamber of said escutcheon having its base held between said diaphragm sealing element and said contact ring and having an upwardly extending portion which contacts said push button when said push button is depressed.

9. The push button assembly of claim 1 wherein said housing has an annular depression in said floor area adjacent the inner edge of said circular ridge.

10. The push button assembly of claim 1 wherein the floor area is a generally inclined spiral to reduce the chance that the diaphragm becomes held by a partial vacuum between the lower surface of the diaphragm and the floor.

11. A finger-controlled push button assembly mounted in a wall for moving a volume of fluid out of and into a port, said assembly comprising:
   a housing having at least one port for the passage of fluid, said housing having a circular ridge formed on the floor thereof, said circular ridge surrounding a floor area and having a sealing surface located about the exterior of the circular ridge, and said port having an inner terminus which is located in said floor area;
   a rubber, circular, domed diaphragm mounted in said housing, and the base of said diaphragm lying along the outer periphery of said circular ridge, and said diaphragm having an outwardly extending contact ring and the domed portion of said diaphragm positioned above the floor area, said diaphragm having sufficient thickness so that although it is deformable, it readily returns to its original shape;
   a wall for mounting the push button assembly, said wall having an inner surface and an outer surface, said wall having a hole formed therein;
   a diaphragm sealing element threadably affixed to said housing, said diaphragm sealing element having a circular inner surface which, when tightened, forces the contact ring of said diaphragm against the sealing surface of said housing;
   an escutcheon member threaded into said diaphragm sealing element, said escutcheon member having a narrow shank having thread means thereon and having a widened escutcheon portion which abuts the outer surface of the wall, said escutcheon member having a chamber for housing a push button and having a passageway extending through the escutcheon portion; and
   push button means having a widened piston portion held in the chamber of said escutcheon member, the terminal portion thereof contacting the domed diaphragm and a narrower button portion which extends through the passageway of the escutcheon member to permit the operation thereof from the outer surface of the wall whereby when the narrower button portion is pushed, the terminal portion of said push button means depresses said domed diaphragm forcing the fluid within said dome through the port, and when said button is released, said domed diaphragm returns to its original shape thereby pulling fluid back in through said port.

12. The finger-controlled push button assembly of claim 11 wherein said housing has an annular depression in said floor area adjacent the inner edge of said circular ridge.

13. The finger-controlled push button assembly of claim 11 wherein the floor area is a generally inclined spiral to reduce the chance that the diaphragm becomes held by a partial vacuum between the lower surface of the diaphragm and the floor.

14. The finger-controlled push button assembly of claim 11 further including spring means between the floor of said housing and the inner surface of the domed portion of said diaphragm.

15. A foot-controlled push button assembly mounted in a plate for moving a volume of fluid out of and into a port, said assembly comprising:
   a housing having at least one port for the passage of fluid, said housing having a circular ridge formed on the floor thereof, said circular ridge surrounding a floor area and having a sealing surface located about the exterior of the circular ridge, and said port having an inner terminus which is located in said floor area;
   a rubber, circular, domed diaphragm mounted in said housing, and the base of said diaphragm lying along the outer periphery of said circular ridge, and said diaphragm having an outwardly extending contact ring, and the domed portion of said diaphragm positioned above the floor area, said diaphragm having sufficient thickness so that although it is deformable, it readily returns to its original shape;
   a plate for mounting the push button assembly, said plate having an inner surface and an outer surface, said plate having a hole formed therein;
   a foot button stop element held in said housing and having a ring positioned above said contact ring of said diaphragm;
   a diaphragm sealing element and escutcheon member affixed to said housing, said diaphragm sealing element having a circular contact ring tightened against the ring of said foot button stop element, and the upper portion of said sealing element having an escutcheon portion which abuts the outer surface of the wall, said escutcheon portion having a chamber for housing a push button and having a passageway and push button support extending through the escutcheon portion; and
   push button means having a piston portion held in the chamber of said diaphragm sealing element and escutcheon member, the terminal portion thereof contacting the domed diaphragm and a button portion which extends through the passageway of the escutcheon member to permit the operation thereof from the outer surface of the plate; and a stop cone supported between said diaphragm sealing element and escutcheon member and the contact ring of said domed diaphragm, said stop cone extending upwardly and terminating with an upper stop ring which contacts the undersurface of said button portion of said push button means when said push button means is fully depressed whereby when the button portion is pushed, the piston portion of said push button means depresses said domed diaphragm forcing the fluid within said domed diaphragm through the port and when said button is released, said domed diaphragm returns to its original shape thereby pulling fluid back in through said port.

16. The foot-controlled push button assembly of claim 15 wherein said stop cone has a cylindrical portion at the upper surface thereof, and the button portion of the push button means has a cylindrical protrusion positioned axially and extending downwardly therefrom, said cylindrical protrusion having an outside diameter which fits closely within the inside diameter of the cylindrical portion of the stop cone.

17. The foot-controlled push button assembly of claim 16 further including a sleeve guide and bearing located in a recess in said cylindrical protrusion of said button portion to reduce sliding friction between said cylindrical portion of said stop cone and the cylindrical protrusion of said button portion.

18. The foot-controlled push button assembly of claim 15 wherein said sleeve guide and bearing is stainless steel.

19. The foot-controlled push button assembly of claim 15 wherein said piston portion of said push button means has contact disk at its lower terminus.

20. The foot-controlled push button assembly of claim 15 wherein the piston portion is held to the button portion by a ring and groove snap connection.

21. The foot-controlled push button assembly of claim 15 wherein said housing further includes a plurality of fingers extending into and snapping onto said plate whereby said housing is held by said plate.

22. The foot-controlled push button assembly of claim 15 wherein said push button means has stop rim formed about the button portion thereof below the passageway of the escutcheon member, whereby outward movement of the pushbutton is limited by contact of said stop rim with the lower surface of the escutcheon.

23. The foot-controlled push button assembly of claim 15 wherein the contact disk abuts the stop cone when the push button means is in its uppermost position.

24. The foot-controlled push button assembly of claim 15 wherein the lower half of said stop cone is solid and prevents dirt from passing therethrough and onto the upper surface of said diaphragm.

25. The foot-controlled push button assembly of claim 15 wherein said stop cone has least one air vent therethrough.

26. A push button assembly mounted in a wall for moving a volume of fluid out of and into a port, said assembly comprising:

a housing having at least one port for the passage of fluid, said housing having a circular ridge formed on the floor thereof, said circular ridge surrounding a floor area, said floor area being generally inclined spiral and having a sealing surface located about the exterior of the circular ridge, and said port having an inner terminus which is located in said floor area;

a rubber, circular, domed diaphragm mounted in said housing and the base of said diaphragm lying along the outer periphery of said circular ridge, said diaphragm having sufficient thickness so that although it is deformable, it readily returns to its original shape;

a wall for mounting the push button assembly, said wall having an inner surface and an outer surface, said wall having a hole formed therein;

a diaphragm sealing element affixed to said housing, said diaphragm sealing element having a circular inner surface which, when tightened, forces said diaphragm against the sealing surface of said housing;

an escutcheon member affixed to said housing, said escutcheon member having a widened escutcheon portion which abuts the outer surface of the wall, and further having a passageway extending through the escutcheon portion for passage of the push button; and push button means having a piston portion, the terminal portion thereof contacting the domed diaphragm and a button portion which extends through the passageway of the escutcheon member to permit the operation thereof from the outer surface of the wall whereby when the button portion is pushed, the terminal portion of said push button means depresses said domed diaphragm forcing the fluid within said dome through the port and when said button is released, said domed diaphragm returns to its original shape thereby pulling fluid back in through said port.

27. The push button assembly of claim 26 further including an annular depression in said floor area.

28. A push button assembly for moving a volume of fluid out of and into a port, said assembly comprising:

a housing having at least one port for the passage of fluid, said housing having a floor area and said port having a inner terminus which is located in said floor area;

a rubber, circular, domed diaphragm sealed about its outer periphery in said housing and the base of said diaphragm lying above the floor area, said diaphragm having sufficient thickness so that although it is deformable, it readily returns to its original shape;

a button support cone having a circular base held against the outer periphery of said domed diaphragm, said button support cone having a conical portion, including at least one air vent therethrough said conical portion, extending upwardly over a portion of said domed diaphragm and terminating in a cylindrical button support cylinder;

a diaphragm sealing element affixed to said housing, said diaphragm sealing element having a circular inner surface which, when tightened, forces the exterior periphery of said diaphragm against said housing; and push button means having a button portion and having a piston portion held in the cylindrical button support cylinder of said button support cone, said piston portion contacting said domed diaphragm whereby when the button portion is pushed, the terminal portion of said piston portion depresses said domed diaphragm forcing the fluid within said dome through the port and when said button is released, said domed diaphragm returns to its original shape thereby pulling fluid back in through said port.

29. The push button assembly of claim 28 further including a sleeve having a low coefficient of friction with respect to said button support cylinder, said sleeve being positioned between said cylindrical button support cylinder and said piston portion.

* * * * *